United States Patent [19]

Pabla et al.

[11] Patent Number: 5,780,974
[45] Date of Patent: Jul. 14, 1998

[54] DAYTIME RUNNING LIGHTS

[75] Inventors: Parmjit S. Pabla, Fort Wayne; Merrill D. Miller, Huntington, both of Ind.

[73] Assignee: Navistar International Transportation Corp., Chicago, Ill.

[21] Appl. No.: 694,006

[22] Filed: Aug. 7, 1996

[51] Int. Cl.⁶ ..................... B60Q 1/02
[52] U.S. Cl. ............... 315/82; 315/83; 315/80; 307/10.1; 307/10.8
[58] Field of Search ............ 315/77, 80, 82, 315/83, 90; 307/10.1, 10.8, 29, 42, 147

[56] References Cited

U.S. PATENT DOCUMENTS

| | | |
|---|---|---|
| 1,269,954 | 6/1918 | Nigh . |
| 3,262,011 | 7/1966 | Cones ............ 315/82 |
| 3,305,695 | 2/1967 | Late ............. 315/82 |
| 3,341,736 | 9/1967 | Fortney .......... 315/82 |
| 3,391,301 | 7/1968 | Poznik ........... 315/83 |
| 3,706,006 | 12/1972 | Miller ........... 315/83 |
| 4,667,129 | 5/1987 | Papillon ......... 315/82 |
| 4,684,819 | 8/1987 | Haag et al. ...... 307/10 R |
| 4,686,423 | 8/1987 | Eydt ............. 315/82 |
| 4,928,036 | 5/1990 | Abboud ........... 315/82 |
| 4,949,012 | 8/1990 | Irick et al. ..... 315/82 |
| 5,030,884 | 7/1991 | Roussey et al. ... 315/83 |
| 5,081,565 | 1/1992 | Nabha et al. ..... 315/82 X |
| 5,245,251 | 9/1993 | Irick ............ 315/82 |
| 5,646,485 | 7/1997 | Simon et al. ..... 315/82 |

FOREIGN PATENT DOCUMENTS 7703951-9  9/1979  Sweden .

OTHER PUBLICATIONS

"Electrical Circuit Diagrams" Manual No. CTS–51225 (Jan. 1995) Navistar International Transportation Corp., 1994, pp. 172–175.

"Electrical Circuit Diagrams" Manual No. CTS–51195 (Jan. 1995) Navistar International Transportation Corp., 1994, pp. 108–112.

Primary Examiner—Robert Pascal
Assistant Examiner—Haissa Philogene
Attorney, Agent, or Firm—Dennis K. Sullivan

[57] ABSTRACT

An automotive vehicle exterior illumination circuit includes a main headlamp circuit, including a headlamp switch, for operating the headlamps at full intensity and a DRL control incorporating voltage-dropping resistance in a daytime running headlamp circuit for achieving reduced intensity daytime running illumination. The resistance is provided by a plurality of resistance wires mutually connected in parallel in a wiring harness carrying electric current to the headlamp filaments. The headlamp switch is provided not only with the usual set of normally open contacts that close when the headlamp switch is turned on to provide full nominal supply voltage to the similarly rated headlamps, but also a set of normally closed contacts that allows DRL operation when the headlamp switch is off but disallows DRL operation when the headlamp switch is on. A fog lamp system is associated with the main headlamp circuit such that fog lamp operation is allowed only when the headlamps are turned on by the headlamp switch and low beams are selected by the dimmer switch. Fog lamp operation is otherwise disallowed, including disallowance during daytime running illumination.

16 Claims, 4 Drawing Sheets

LOGIC MAP 100

| VEHICLE PARK BRAKES ① ② | HDLT SWITCH ③ 20 | DIMMER SWITCH MODE 28 | HEAD LIGHTS ④ 12,14 | FOG LT SWITCH 22 | FOG LIGHTS 16,18 | IGN. SWITCH 341 | DLR LIGHTS |
|---|---|---|---|---|---|---|---|
| ON | ON | LOW | LOW | ON | ON | ON | OFF |
| ↓ | ↓ | ↓ | ↓ | ↓ | ↓ | OFF | OFF |
| ↓ | ↓ | ↓ | ↓ | OFF | OFF | ON | OFF |
| ↓ | ↓ | ↓ | ↓ | ↓ | ↓ | OFF | OFF |
| ↓ | ↓ | HIGH | HIGH | ON | OFF | ON | OFF |
| ↓ | ↓ | ↓ | ↓ | ↓ | ↓ | OFF | OFF |
| ↓ | ↓ | ↓ | ↓ | OFF | OFF | ON | OFF |
| ↓ | ↓ | ↓ | ↓ | ↓ | ↓ | OFF | OFF |
| ON | OFF | LOW | OFF | ON | OFF | ON | OFF |
| ↓ | ↓ | ↓ | ↓ | ↓ | ↓ | OFF | OFF |
| ↓ | ↓ | ↓ | ↓ | ON | OFF | ON | OFF |
| ↓ | ↓ | ↓ | ↓ | ↓ | ↓ | OFF | OFF |
| ↓ | ↓ | HIGH | OFF | ON | OFF | ON | OFF |
| ↓ | ↓ | ↓ | ↓ | ↓ | ↓ | OFF | OFF |
| ↓ | ↓ | ↓ | ↓ | OFF | OFF | ON | OFF |
| ↓ | ↓ | ↓ | ↓ | ↓ | ↓ | OFF | OFF |
| OFF | ON | LOW | LOW | ON | ON | ON | OFF |
| ↓ | ↓ | ↓ | ↓ | ↓ | ↓ | OFF | OFF |
| ↓ | ↓ | ↓ | ↓ | OFF | OFF | ON | OFF |
| ↓ | ↓ | ↓ | ↓ | ↓ | ↓ | OFF | OFF |
| ↓ | ↓ | HIGH | HIGH | ON | OFF | ON | OFF |
| ↓ | ↓ | ↓ | ↓ | ↓ | ↓ | OFF | OFF |
| ↓ | ↓ | ↓ | ↓ | OFF | OFF | ON | OFF |
| ↓ | ↓ | ↓ | ↓ | ↓ | ↓ | OFF | OFF |
| OFF | OFF | LOW | OFF | ON | OFF | ON | ON |
| ↓ | ↓ | ↓ | ↓ | ↓ | ↓ | OFF | OFF |
| ↓ | ↓ | ↓ | ↓ | OFF | OFF | ON | ON |
| ↓ | ↓ | ↓ | ↓ | ↓ | ↓ | OFF | OFF |
| ↓ | ↓ | HIGH | OFF | ON | OFF | ON | ON |
| ↓ | ↓ | ↓ | ↓ | ↓ | ↓ | OFF | OFF |
| ↓ | ↓ | ↓ | ↓ | OFF | OFF | ON | ON |
| ↓ | ↓ | ↓ | ↓ | ↓ | ↓ | OFF | OFF |

① VEHICLE PARK BRAKE "ON" IMPLIES PARK BRAKES APPLIED (P.B. SWITCH 30 OPEN).

② VEHICLE PARK BRAKE "OFF" IMPLIES PARK BRAKES NOT APPLIED (P.B. SWITCH 30 CLOSED).

③ HEAD LIGHT SWITCH "ON" IMPLIES SWITCH 20 IS IN THE HEAD LIGHT POSITION NOT THE PARK LIGHT POSITION.

④ HEAD LIGHT SWITCH "OFF" IMPLIES SWITCH 20 IS IN THE OFF POSITION NOT THE PARK LIGHT POSITION.

1
DAYTIME RUNNING LIGHTS

FIELD OF THE INVENTION

This invention relates generally to automotive vehicle exterior lighting, and more particularly to daytime running lights (DRL) circuits.

THE PRIOR ART

Exemplary DRL circuits are disclosed in commonly assigned U.S. Pat. Nos. 4,949,012; 5,030,884; and 5,245,251. The particular DRL circuits disclosed in these patents utilize electromechanical relays. The use of relays in DRL circuits is not broadly novel, and such uses in fact appear in patents other than the three patents just mentioned. DRL circuits disclosed in still other patents employ electronic devices.

A number of known DRL circuits illuminate the right and left headlamps of the vehicle to signal daytime running. Often the voltage that is applied to each of the headlamp filaments is less than its nominally rated operating voltage, causing the headlamps to illuminate at less than full nominally rated intensity. There are various known techniques for causing such reduced intensity illumination for daytime running.

One technique comprises the use of a relay to connect a right headlamp filament and a left headlamp filament in series whereby each filament operates at essentially one-half its rated voltage for daytime running illumination. An example of this appears in the above-mentioned U.S. Pat. No. 4,949,012. Another technique involves pulse width modulating the vehicle's nominal power supply voltage to the headlamp filaments so that the average voltage applied across them is less than their nominally rated operating voltage. An example of this is shown in U.S. Pat. No. 4,684,819. A further technique involves use of a voltage regulator to reduce the voltage, such as shown in U.S. Pat. No. 4,686,423.

Still another technique comprises connecting a resistor in series with one or both headlamps for daytime running illumination. The resistor drops the voltage applied across the headlamp filament(s), thereby providing reduced intensity daytime illumination. Examples of this appear in U.S. Pat. Nos. 3,262,011; 3,391,301; and Sweden 77039519.

Utilization of a voltage dropping resistor to reduce the headlamp filament voltage can be considered as an alternative to the use of a relay to connect a right headlamp filament and a left headlamp filament in series for daytime running illumination. However, the inclusion of such a resistor in a circuit requires one that has sufficient capacity to carry the current through it while dissipating the heat that is generated therein because of I2R power loss. Special mounting, or other accommodation, may have to be made to dissipate this heat.

SUMMARY OF THE INVENTION

One aspect of the present invention relates to a new and unique DRL circuit having novel means for incorporating voltage-dropping resistance in a daytime running headlamp circuit for achieving reduced intensity daytime running illumination. A presently preferred embodiment of the invention employs known components but embodies them in a new and unique cooperative association to achieve the desired objective. More specifically, such a presently preferred embodiment provides voltage-dropping resistance in a daytime running headlamp circuit, for reduced intensity daytime running illumination, by incorporating a plurality of resistance wires, mutually connected in parallel, in a wiring harness carrying electric current to the headlamp filaments. Collectively, the parallel combination of such resistance wires provides a suitable equivalent resistance for attenuating the illumination intensity of the headlamps to provide daytime running illumination, yet the resistance wires need no special accommodation for dissipating the heat generated in them as they carry the daytime running light current. This is because they inherently provide a total surface area that is greater than that provided by a single resistor, and the surface area extends along the lengths of the resistance wires, thereby distributing heat over the length of each individual resistance wire. The use of multiple resistance wires also provides redundancy along the portion of a wiring harness that contains them.

Another aspect, of the present invention, relates to a novel headlamp circuit configuration of a headlamp switch and DRL control, wherein the headlamp switch is provided not only with the usual set of normally open contacts that close when the headlamp switch is turned on to provide full nominal supply voltage to the similarly rated headlamps, but also a set of normally closed contacts that allows DRL operation when the headlamp switch is off but disallows DRL operation when the headlamp switch is on.

Still another inventive aspect concerns a novel lamp circuit configuration for a vehicle that also contains fog lamps. This circuit configuration allows fog lamp operation only when the headlamps are turned on by the headlamp switch and low beams are selected by the dimmer switch. Fog lamp operation is otherwise disallowed, including disallowance during daytime running illumination. U.S. Pat. No. 4,928,036 shows an external vehicle lighting circuit that provides daytime running illumination and that contains fog lamps. The circuit in that patent shows fog lamp operation is allowed only when the headlamp switch is operated to a park position of the headlamp switch, which is a position that is intermediate the on and off positions.

The foregoing, along with further features and advantages of the invention, will be seen in the following disclosure of a presently preferred embodiment of the invention depicting the best mode contemplated, at this time, for carrying out the invention. The disclosure includes drawings, as now briefly described.

BRIEF DESCRIPTION OF THE DRAWINGS

FIG. 4 is a logic map showing various modes of headlamp and fog lamp operation for different conditions of various switches associated with the circuit of FIG. 1.

DESCRIPTION OF THE PREFERRED EMBODIMENT

Figure 1:
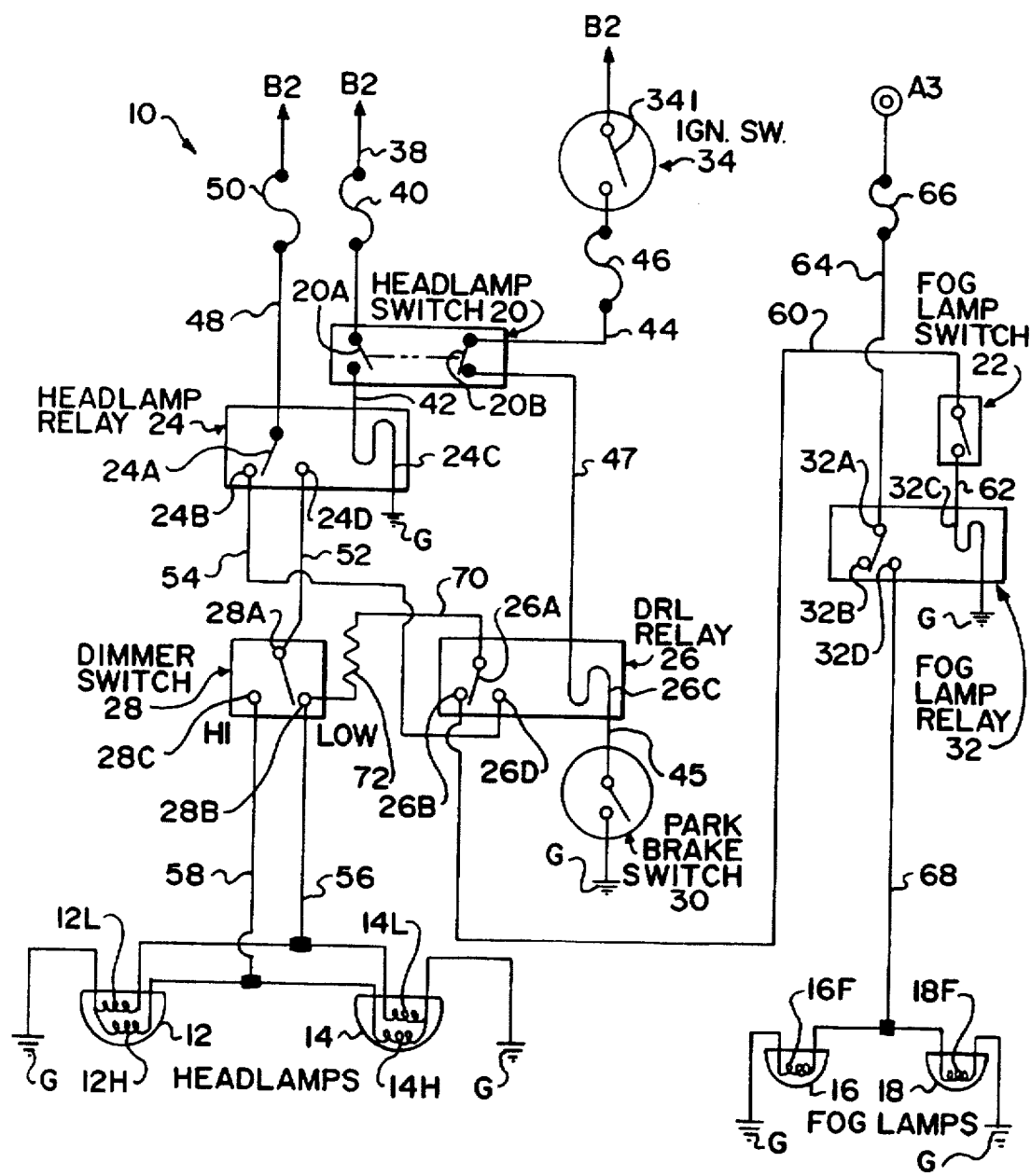
FIG. 1 is an electrical schematic diagram of a first embodiment of exterior illumination circuit according to principles of the present invention.

FIG. 1 shows a first embodiment of inventive headlamp circuit 10 for an automotive vehicle. The vehicle has right and left headlamps 12 and 14 respectively, each of which is shown by example as a dual filament device having a respective high beam filament 12H, 14H, and a respective low beam filament 12L, 14L. One side of each filament is connected to ground G. The vehicle also has right and left fog lamps 16 and 18 respectively, each of which is shown by example as a single filament device having a respective filament 16F, 18F, one side of which is connected to ground G.

Circuit 10 further comprises a headlamp switch 20, a fog lamp switch 22, a headlamp relay 24, a daytime running lights (DRL) relay 26, a headlamp dimmer switch 28, a parking brake switch 30, a fog lamp relay 32, and a typical vehicle ignition switch 34 that is operable to on, off, start, and accessory positions. Only the ignition contacts 34I are shown in FIG. 1. The vehicle has a typical electrical power supply comprising a source of D.C. potential B2 relative to ground G. By way of example, each filament of headlamps 12, 14 and of fog lamps 16, 18 is rated for nominal 12.8 volt operation to provide nominal full intensity illumination. The source of D.C. potential is somewhat higher, for example nominally +14.2 volts while the engine is running. Depending upon wiring and connector resistance in the circuit between the source of D.C. potential and a lamp filament, the operating voltage across a lamp filament may differ to a small degree from its nominal operating voltage. It is to be understood that principles of the invention may also be practiced with electrical systems other than nominal +14.2 volt D.C. systems.

Headlamp switch 20 comprises a set of normally open contacts 20A and a set of normally closed contacts 20B. Each of relays 24, 26, and 32 comprises a respective coil 24C, 26C, 32C, a respective movable contact 24A, 26A, 32A that is operated by the respective relay coil, and a respective pair of fixed contacts 24B, 24D; 26B, 26D; 32B, 32D. Dimmer switch 28 comprises a movable contact 28A and two fixed contacts 28B, 28C.

FIG. 1 shows a condition where none of coils 24C, 26C, 32C is being energized. In this condition movable contact 24A is making contact with fixed contact 24B and not with fixed contact 24D, movable contact 26A is making contact with fixed contact 26B and not with fixed contact 26D, and movable contact 32A is making contact with fixed contact 32B and not with fixed contact 34D. FIG. 1 further shows headlamp switch 20 off, fog lamp switch 22 off, dimmer switch 28 in low beam position where movable contact 28A is making contact with fixed contact 28B and not with fixed contact 28C, ignition switch contacts 34I open, and the contacts of parking brake switch 30 open.

Ignition switch contacts 34I close when the vehicle ignition switch 34 is operated to on and start positions. Parking brake switch 30 closes when the vehicle parking brake is not being applied, i.e. is released.

The hot side of headlamp switch contact set 20A is connected to power supply potential B2 via a feed 38 that contains an in-line overload protection device 40. The load side of headlamp switch contact set 20A is connected to one side of coil 24C via a feed 42. The other side of coil 24C is connected to ground G. The hot side of headlamp switch contact set 20B is connected to the load side of ignition contacts 34I via a feed 44 that contains an in-line overload protection device 46. The hot side of ignition contacts 34I is connected to B2 potential. The load side of contact set 20B is connected via a feed 47 to one side of coil 26C of DRL relay 26. The other side of coil 26C is connected via a feed 45 to one side of parking brake switch 30, the other side of switch 30 being connected to ground G.

Movable contact 24A of relay 24 is connected to power supply potential B2 via a feed 48 that contains an in-line overload protection device 50. Fixed contact 24D is connected via a feed 52 to movable contact 28A of dimmer switch 28. Fixed contact 24B is connected via a feed 54 to fixed contact 26D of DRL relay 26.

Fixed contacts 28B, 28C of dimmer switch 28 are connected by respective feeds 56, 58 to low beam filaments 12L, 14L and to high beam filaments 12H, 14H, respectively.

Fixed contact 26B of DRL relay 26 is connected via a feed 60 to the hot side of fog lamp switch 22, the load side of switch 22 being connected via a feed 62 to one side of coil 32C of fog lamp relay 32, and the load side of coil 32C being connected to ground G. Movable contact 32A of relay 32 is connected via a feed 64 that contains an in-line overload protection device 66 to an accessory terminal A3 that receives potential B2 when ignition switch 34 is in on or accessory position. Fixed contact 32D of relay 32 is connected via a feed 68 to the ungrounded side of fog lamp filaments 16F, 18F. Fixed contact 32B of relay 32 is not connected, and could, if desired, be eliminated from the relay. A feed 70 containing an in-line resistance 72 connects movable contact 26A of relay 26 and fixed contact 28B of dimmer switch 28.

The vehicle is considered to be running when ignition switch 34 is on and the parking brake is released. Daytime running operation ensues during vehicle running so long as headlamp switch 20 remains off. Closure of ignition switch contacts 34I and of the contacts of parking brake switch 30 complete a series circuit through the normally closed contact set 20B of headlamp switch 20 to cause the B2 voltage to be impressed across coil 26C, thereby energizing the coil. As a consequence, movable contact 26A operates to break contact with fixed contact 26B and to make contact with fixed contact 26D. The closure of these latter two contacts completes a series circuit through the closed contacts 24A, 24B of headlamp relay 24, through feed 70, and through low beam headlamp filaments 12L, 14L across the B2 voltage. Resistance 72 is chosen to have a value that creates a voltage drop that drops the voltage across filaments 12L, 14L to less than the B2 voltage. This reduced voltage applied to these filaments provides daytime running light illumination for the vehicle. By way of example, resistance 72 may have a value of approximately 0.37 ohms and dissipate approximately 25 watts of power. This corresponds to a resistance wire voltage drop of around three volts so that the voltage applied across the headlamp filaments is about 10 volts, approximately 2.8 volts less than their nominally rated operating voltage. Such a reduced voltage results in the filaments providing daytime running illumination of an intensity less than the nominal intensity that would otherwise be produced were nominal voltage applied across the filaments.

Occurrence of any one or more of the following listed conditions will interrupt the series circuit energizing relay coil 26C, dropping out coil 26C and causing DRL relay 26 to revert to the condition depicted by FIG. 1: 1) opening ignition switch contacts 34I by operating ignition switch 34 to off position; 2) applying the vehicle parking brake to open switch 30; and 3) turning headlamp switch 20 on.

When headlamp switch 20 is turned on, contact set 20B opens to disallow DRL operation. Contact set 20A however closes to energize coil 24C of headlamp relay 24. As a result, movable contact 24A breaks contact with fixed contact 24B and now makes contact with fixed contact 24D. This completes a circuit from the B2 potential to contact 28A of dimmer switch 28. Consequently, headlamps 12, 14 illuminate at their full rated intensity corresponding to application of full nominally rated operating voltage across either high beam filaments 12H, 14H or low beam filaments 12L, 14L, as selected by operation of dimmer switch 28 to either high beam position or low beam position.

Because B2 voltage is applied to dimmer switch contact 28A via headlamp relay 24 when headlamp switch 20 is on, operation of fog lamps 16, 18 is allowed whenever dimmer switch 28 is selecting headlamp low beams, but not when dimmer switch 28 is selecting high beams. It can be perceived that when the headlamp switch is on and the dimmer switch is in low beam position, B2 voltage is applied through feed 70 and the closed contacts 26A, 26B of the de-energized DRL relay 26 to the hot side of fog lamp switch 22. Thus, when the headlamp low beams are operated via headlamp switch 20 being on, closure of fog lamp switch 22 will energize fog lamp relay coil 32C, closing contacts 32A and 32D to cause B2 voltage to be applied across fog lamp filaments 16F, 18F and achieve full intensity of fog lamp illumination. Whether or not the parking brake is applied has no bearing on allowing fog lamp operation, but feed 64 for the fog lamps is preferably from a line or terminal that is hot only when ignition switch 34 is in the on position or the accessory position.

FIG. 4 is a logic map 100 showing various modes of headlamp and fog lamp operation for different conditions of various switches associated with the circuit of FIG. 1. The map is an eight-column matrix that present every possible combination of positions of parking brake switch 30, headlamp switch 20, dimmer switch 28, fog lamp switch 22, and ignition contacts 34I. Hence, logic map 100 contains thirty-two rows each representing a unique combination, and each row shows the condition of headlamps 12, 14 in the fourth column, the condition of fog lamps 16, 18 in the sixth column, and the condition of daytime running illumination in the eighth column. It is to be understood that the "YES" indications in the daytime running column mean that the headlamps are being operated at reduced intensity to provide DRL illumination, and that the "NO" indications in that column do not necessarily imply that the headlamps are not being operated either at rated high-beam intensity or at rated low-beam intensity. Operation of the headlamps either at rated high-beam intensity or at rated low-beam intensity is indicated in the fourth column.

Figure 2:
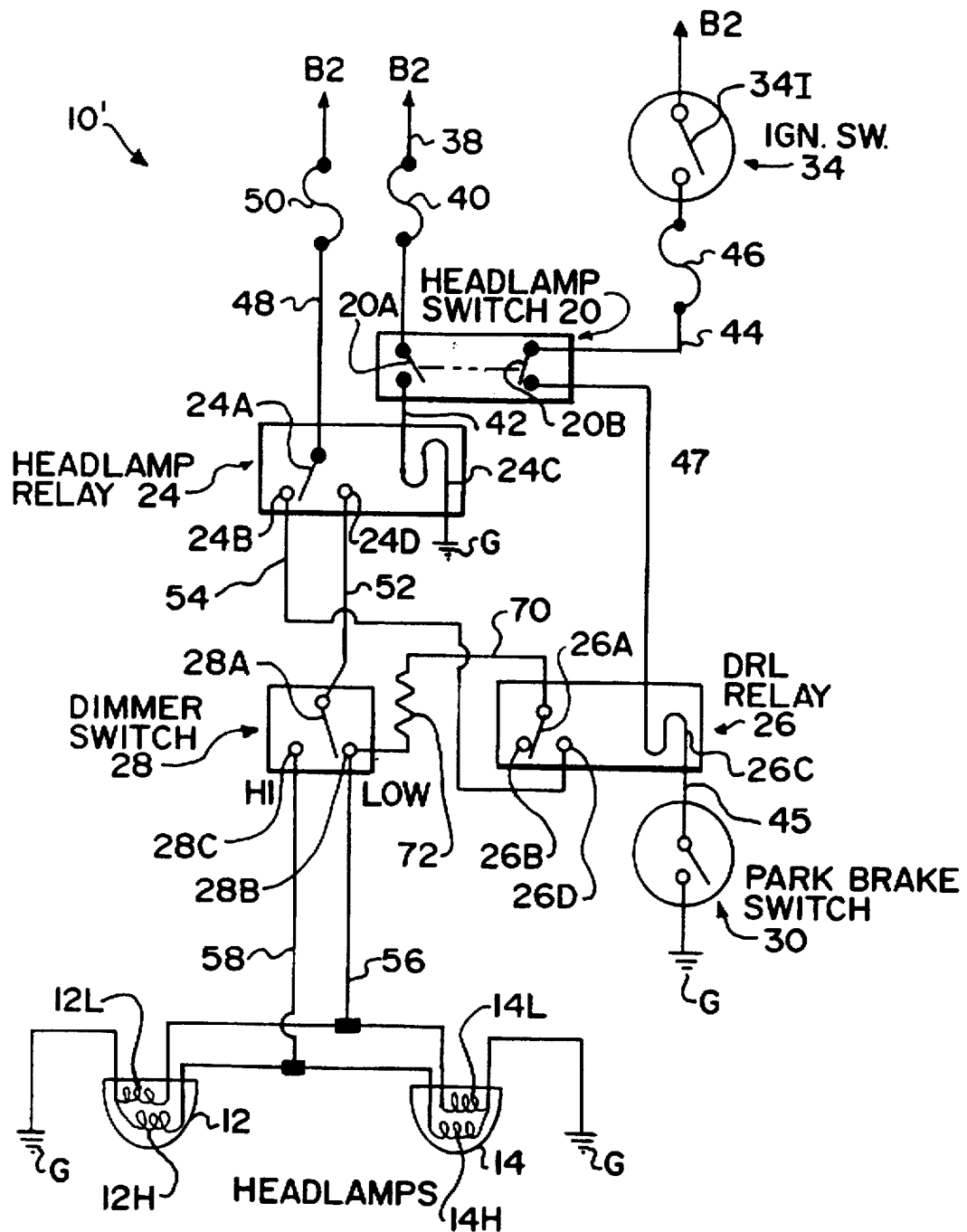
FIG. 2 is an electrical schematic diagram of a second embodiment of exterior illumination circuit according to principles of the present invention.

FIG. 2 shows a second circuit 10' which is exactly like circuit 10 of FIG. 1, except that it lacks a fog lamp system. Hence, it contains the same components as in FIG. 1, which are identified by the same reference numerals, but it lacks fog lamp switch 22, fog lamp relay 32, fog lamps 16, 18, and feeds 60, 62, 64, and 68. Circuit 10' performs DRL and headlamp illumination functions in the same manner as circuit 10.

Figure 3:
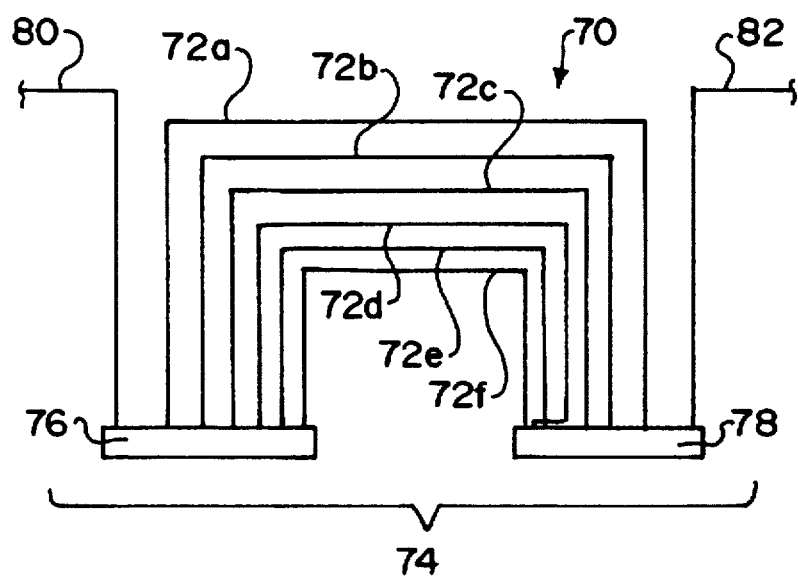
FIG. 3 is an electrical schematic diagram illustrating an exemplary wiring harness used with the circuits of FIGS. 1 and 2.

FIG. 3 shows detail of feed 70. Resistance 72 is provided by a number of individual resistance wires 72a-72f mutually connected in parallel in a wiring harness 74. Collectively, the parallel combination of these resistance wires provides a suitable equivalent resistance for attenuating the illumination intensity of the headlamps to provide daytime running illumination, yet the resistance wires need no special accommodation for dissipating the heat generated in them as they carry the daytime running current. This is because they inherently provide a total surface area that is greater than that provided by a single resistor, and the surface area extends along the lengths of the resistance wires, thereby distributing heat over the length of each individual resistance wire.

The use of six resistance wires to fabricate resistance 72 is an example that represents a specific usage of the inventive principles in a particular vehicle. In the example, each of the individual wires 72a-72f is insulated eighteen gauge stranded stainless steel wire of suitable length so that the resistance wires collectively provide a specified equivalent resistance that will produce the proper voltage drop for the headlamps to illuminate at specified daytime running illumination intensity. One end of each resistance wire is stripped of its insulation, or otherwise exposed, and these ends are connected in common at a common connection 76. The other end of each wire 72a-72f is stripped of its insulation, or otherwise exposed, and these ends are connected in common at a common connection 78. At connection 76, one end of a seventh wire 80 is stripped of its insulation, or otherwise exposed, and conductively connected in common with the ends of wires 72a-72f. At connection 78, one end of a seventh wire 82 is stripped of its insulation, or otherwise exposed, and conductively connected in common with the ends of wires 72a-72f. Feed 70 thus comprises the two seventh wires 80, 82, the six mutually parallel resistance wires 72a-72e, and the common connections 76, 78, with the plural insulated resistance wires being connected in series with and between the two seventh wires 80, 82. In the example, the two seventh wires 80, 82 are each insulated twelve gauge stranded copper wire. FIG. 3 represents what can be either an individual wiring harness by itself or else a portion of a larger wiring harness.

While a presently preferred embodiment of the invention has been illustrated and described, it should be appreciated that principles of the invention are applicable to all embodiments that fall within the scope of the claims that follow hereinafter. For example, a determination of vehicle running may be made by using other than concurrent closure of ignition contacts 34I and the contacts of parking brake switch 30. Likewise, the inventive principles may be practiced with headlamp configurations other than the two dual-filament headlamps shown herein. While both right and left headlamps are advantageously fed through a single common set of resistance wires, such as 72a-72e, for DRL illumination, the use of an individual set of resistance wires for each headlamp is also contemplated.

What is claimed is:

1. An automotive vehicle headlamp circuit that is powered from a voltage source of a vehicle and includes daytime running illumination, said circuit comprising in combination:

a) a right headlamp on a right side of a vehicle and a left headlamp on a left side of a vehicle;

b) a headlamp switch that is selectively operable to off and on positions for selectively turning the headlamps off and on;

c) a main headlamp circuit controlled by said headlamp switch for operating said headlamps substantially at nominally rated operating voltage when said headlamp switch is operated to on position; and d) a daytime running control for operating said headlamps at less than nominally rated operating voltage to provide daytime running illumination intensity during vehicle running when said headlamp switch is in off position;

e) a daytime running headlamp circuit that is under control of said daytime running control and comprises voltage dropping resistance in series with said headlamps for causing said headlamps to operate at less than nominally rated operating voltage and thereby provide daytime running illumination intensity when said daytime running control is operating said headlamps; and f) wherein said resistance comprises plural insulated resistance wires connected in mutually parallel circuit relationship in a wiring harness.

2. An automotive vehicle headlamp circuit as set forth in claim 1 in which said wiring harness further includes at least one additional insulated wire connected in series with said resistance wires, said at least one additional insulated wire having a smaller wire gauge number than any one of said resistance wires.

3. An automotive vehicle headlamp circuit as set forth in claim 2 in which said at least one additional insulated wire comprises a first additional insulated wire and a second additional insulated wire, and said plural insulated resistance wires are connected in series with and between said first and second additional insulated wires.

4. An automotive vehicle headlamp circuit as set forth in claim 1 in which said plural insulated resistance wires are connected in series with both headlamps so that said plural insulated resistance wires carry daytime running current to both headlamps.

5. An automotive vehicle headlamp circuit as set forth in claim 4 in which each of said headlamps comprises a high beam filament and a low beam filament, said main headlamp circuit comprises a dimmer switch that is connected between said headlamp switch and said headlamps and that is selectively operable for selectively connecting said headlamp switch to said high beam filaments and said low beam filaments respectively, said daytime running control comprises a relay having a coil and a set of normally open contacts that is operated closed when said relay coil is energized, said set of relay contacts is connected with a feed to said headlamps to conduct daytime running current to said headlamps, and said plural insulated resistance wires are in said feed between said set of relay contacts and said low beam filaments.

6. An automotive vehicle headlamp circuit as set forth in claim 5 in which said wiring harness further includes at least one additional insulated wire connected in series with said resistance wires in said feed between said set of relay contacts and said low beam filaments, said at least one additional insulated wire having a smaller wire gauge number than any one of said resistance wires.

7. An automotive vehicle headlamp circuit as set forth in claim 1 in which said resistance wires are insulated stranded stainless steel wires.

8. An automotive vehicle headlamp circuit that is powered from a voltage source of a vehicle and includes daytime running illumination, said circuit comprising in combination:

a) a right headlamp on a right side of a vehicle and a left headlamp on a left side of a vehicle;
   b) a headlamp switch that is selectively operable to off and on positions for selectively turning the headlamps off and on and that comprises a first set of switch contacts which assume a first state when the headlamp switch is on and a second state when the headlamp switch is off and a second set of switch contacts which assume a first state when the headlamp switch is on and a second state when the headlamp switch is off;
   c) a daytime running control that is responsive to said first set of headlamp switch contacts and to at least one other switch means for distinguishing between a daytime running condition and a non-daytime running condition, and wherein said daytime running control operates to daytime running condition when said first set of headlamp switch contacts and said at least one other switch means indicate daytime running condition, but otherwise operates to non-daytime running condition;
   d) a main headlamp circuit responsive to said second set of headlamp switch contacts for operating said headlamps substantially at nominally rated operating voltage when said headlamp switch is operated to on position; and
   e) a daytime running headlamp circuit for operating said headlamps at less than nominally rated operating voltage to provide daytime running illumination when said daytime running control operates to daytime running condition.

9. An automotive vehicle headlamp circuit as set forth in claim 8 in which said first set of headlamp switch contacts are closed and said second set of headlamp switch contacts are open when said headlamp switch is in off position, and said first set of headlamp switch contacts are open and said second set of headlamp switch contacts are closed when said headlamp switch is in off position.

10. An automotive vehicle headlamp circuit that is powered from a voltage source of a vehicle and includes daytime running illumination, said circuit comprising in combination:

a) a right headlamp on a right side of a vehicle and a left headlamp on a left side of a vehicle;
   b) a headlamp switch that is selectively operable to off and on positions for selectively turning the headlamps off and on and that comprises a first set of switch contacts and a second set of switch contacts;
   c) a daytime running control that is responsive to said first set of headlamp switch contacts and to at least one other switch means for distinguishing between a daytime running condition and a non-daytime running condition, and wherein said daytime running control operates to daytime running condition when said first set of headlamp switch contacts and said at least one other switch means indicate daytime running condition, but otherwise operates to non-daytime running condition;
   d) a main headlamp circuit responsive to said second set of headlamp switch contacts for operating said headlamps substantially at nominally rated operating voltage when said headlamp switch is operated to on position;
   e) a daytime running headlamp circuit for operating said headlamps at less than nominally rated operating voltage to provide daytime running illumination when said daytime running control operates to daytime running condition;
   f) in which said first set of headlamp switch contacts are closed and said second set of headlamp switch contacts are open when said headlamp switch is in off position, said first set of headlamp switch contacts are open and said second set of headlamp switch contacts are closed when said headlamp switch is in off position; and
   g) said daytime running control comprises a relay having a coil and a set of normally open contacts that is operated closed when said relay coil is energized, said first set of headlamp switch contacts is connected in series with said relay coil, and said set of relay contacts is connected with a feed to said headlamps to conduct daytime running current to said headlamps.

11. An automotive vehicle headlamp circuit as set forth in claim 10 in which said feed comprises voltage dropping resistance for causing said headlamps to operate at less than nominally rated operating voltage to provide daytime running illumination.

12. An automotive vehicle headlamp circuit as set forth in claim 10 in which each of said headlamps comprises a high beam filament and a low beam filament, and said feed supplies daytime running current to the low beam filaments of both headlamps.

13. An automotive vehicle headlamp circuit as set forth in claim 10 in which said resistance comprises plural insulated resistance wires connected in mutually parallel circuit relationship in a wiring harness.

14. An automotive vehicle headlamp circuit that is powered from a voltage source of a vehicle and includes daytime running illumination, said circuit comprising in combination:

a) a right headlamp on a right side of a vehicle and a left headlamp on a left side of a vehicle;

b) a headlamp switch that is selectively operable to off and on positions for selectively turning the headlamps off and on and that comprises a first set of switch contacts and a second set of switch contacts;

c) a daytime running control that is responsive to said first set of headlamp switch contacts and to at least one other switch means for distinguishing between a daytime running condition and a non-daytime running condition, and wherein said daytime running control operates to daytime running condition when said first set of headlamp switch contacts and said at least one other switch means indicate daytime running condition, but otherwise operates to non-daytime running condition;

d) a main headlamp circuit responsive to said second set of headlamp switch contacts for operating said headlamps substantially at nominally rated operating voltage when said headlamp switch is operated to on position;

e) a daytime running headlamp circuit for operating said headlamps at less than nominally rated operating voltage to provide daytime running illumination when said daytime running control operates to daytime running condition; and f) in which said daytime running headlamp circuit comprises plural insulated resistance wires connected in mutually parallel circuit relationship in a wiring harness and providing a voltage drop for operating said headlamps at less than nominally rated operating voltage to provide daytime running illumination.

15. An automotive vehicle headlamp circuit that is powered from a voltage source of a vehicle and includes daytime running illumination, said circuit comprising in combination:

a) a right headlamp on a right side of a vehicle and a left headlamp on a left side of a vehicle;

b) a headlamp switch that is selectively operable to off and on positions for selectively turning the headlamps off and on and that comprises a first set of switch contacts and a second set of switch contacts;

c) a daytime running control that is responsive to said first set of headlamp switch contacts and to at least one other switch means for distinguishing between a daytime running condition and a non-daytime running condition, and wherein said daytime running control operates to daytime running condition when said first set of headlamp switch contacts and said at least one other switch means indicate daytime running condition, but otherwise operates to non-daytime running condition.

d) a main headlamp circuit responsive to said second set of headlamp switch contacts for operating said headlamps substantially at nominally rated operating voltage when said headlamp switch is operated to on position;

e) a daytime running headlamp circuit for operating said headlamps at less than nominally rated operating voltage to provide daytime running illumination when said daytime running control operates to daytime running condition; and f) in which each of said headlamps comprises a high beam filament and a low beam filament, said main headlamp circuit comprises a dimmer switch that is connected between said headlamp switch and said headlamps and that is selectively operable for selectively connecting said headlamp switch to said high beam filaments and said low beam filaments respectively, said daytime running control comprises a relay having a coil that is energized when said daytime running control operates to daytime running condition and a movable contact that is selectively operated by said coil to make contact with a first fixed contact of said relay, but not with a second fixed contact of said relay when said relay coil is not energized, and to break contact with said first fixed contact of said relay and make contact with said second fixed contact of said relay when said relay coil is energized, said second fixed relay contact is connected with said main headlamp circuit, said movable relay contact is connected with a feed to said low beams filaments containing voltage dropping resistance for causing said low beam filaments to operate at less than nominally rated operating voltage for daytime running illumination, and a fog lamp system is connected to said first fixed contact of said relay such that said relay allows fog lamp system operation when said headlamp switch is in on position, said dimmer switch is selecting said low beam filaments, and said daytime running control is operated to non-daytime running condition.

16. An automotive vehicle headlamp circuit as set forth in claim 8 in which said at least one other switch means comprises a set of ignition switch contacts of a vehicle ignition switch that senses when the ignition switch is turned on and a parking brake switch that senses when a vehicle parking brake is not being applied, daytime running illumination occurring when the ignition switch is on and the parking brake is not being applied.

* * * * *